US007072969B2

(12) United States Patent
Tomida et al.

(10) Patent No.: US 7,072,969 B2
(45) Date of Patent: Jul. 4, 2006

(54) INFORMATION PROCESSING SYSTEM (75) Inventors: Naoyuki Tomida, Kasugai (JP); Kenjiro Kawato, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 819 days.

(21) Appl. No.: 10/107,389

(22) Filed: Mar. 28, 2002

(65) Prior Publication Data
US 2003/0055966 A1  Mar. 20, 2003

(30) Foreign Application Priority Data
Sep. 14, 2001  (JP) ............................. 2001-279128

(51) Int. Cl.
*G06F 15/173* (2006.01)
*G06F 15/16* (2006.01)
*G06F 17/30* (2006.01)

(52) U.S. Cl. ........................ 709/229; 709/224; 726/2

(58) Field of Classification Search ................ 709/229, 709/216–219, 224–226; 715/741–743; 713/182–184, 713/200–202; 714/702, 703, 763; 710/28, 710/36, 39; 707/10, 9; 726/2
See application file for complete search history.

(56) References Cited

U.S. PATENT DOCUMENTS 6,449,651 B1 * 9/2002  Dorfman et al. ............ 709/229
6,453,353 B1 * 9/2002  Win et al. ................... 709/229
6,728,884 B1 * 4/2004  Lim ........................... 713/201
6,816,970 B1 * 11/2004 Morgan et al. ............. 713/183

FOREIGN PATENT DOCUMENTS

JP            11-31132       2/1999

* cited by examiner

Primary Examiner—Ario Etienne
Assistant Examiner—El Hadji M. Sall
(74) Attorney, Agent, or Firm—Staas & Halsey LLP

(57) ABSTRACT

An information processing system that guarantees sufficient security for a local network and effectively uses resources of the entire local network. The system includes an external connection unit for executing a first program that receives a login request of an external user and for providing the external user with a predetermined service when the external user is verified through the login request. An external verification unit includes an external user management file, in which external user verification information is registered beforehand. The external verification unit compares the input information of the login request with the external user verification information to verify the external user. The external verification unit further includes a process/user association file for storing verified external user verification information and the process ID of the first program in association with each other.

16 Claims, 7 Drawing Sheets

INFORMATION PROCESSING SYSTEM

BACKGROUND OF THE INVENTION

The present invention relates to an information processing system, and more particularly, to an information processing system for managing user verification and access rights in a computer network.

In a network system, such as the Internet, local area networks (LAN, WAN) are formed in units of organizations, such as companies. A local network is connected to a wide area network. To counter attacks from outside of the local network, the local network incorporates a mechanism in the connection between the wide area network and the local network to control access to the local network from the wide area network.

When providing an external device with a service via the wide area network, the number of machines that can be directly accessed from the external device is restricted (normally, to one). The restricted external connection machine performs a front end process to provide the service. The external connection machine is restricted in order to limit the damages inflicted on the network when the network is infiltrated from outside the network.

When an external device is provided with service, such as CAD designs or various analyses, an information processing system includes a web server (external connection machine), which functions as a window for the service, and a processing machine, which processes the provided service. The web server performs the front end process and verifies the user (external user), who is trying to receive the service. Based on instructions from a verified user, the web server requests the processing machine to perform a process (job) corresponding to the service. The web server receives a job result from the processing machine and provides (sends) the result to the user.

There is a problem with access rights when requesting the processing machine to perform a process. An account is set for each job to restrict access to files, data, and programs that are required for providing service. However, a job requested from the web server has the account of the web server, which is the requester of the job. In other words, each job has the same account. Accordingly, access to files or the like is not restricted in accordance with each user.

Presently, there are three ways to solve the problem.

(1) Use a Local Network Verification Mechanism

A user logs in to the local network using a username and a password, which are registered in a verification mechanism of the local network. An account, which is obtained through the login, differs from the account of the front end process of a web server. Thus, access is controlled in accordance with each user.

Japanese Laid-Open Patent Publication No. 11-31132 describes an external connection machine including a device that maps user accounts of an external connection machine (i.e., accounts that are valid only in the web server) and accounts of a processing machine (i.e., accounts that are valid only in the local network).

However, the username and password, which are confidential, are sent from the user's terminal to the web server via the wide area network. Accordingly, data of the username and the password is transmitted through an external network. Further, a terminal connected to the wide area network may directly access a server that is connected to the local network. Therefore, when a third party steals the username and password, the third party would have access to the processing performed by the local network.

Further, to provide service with the web server, the account of the web server is set so that other remote jobs requests may be generated with the web server account. Accordingly, even if the user account of the external connection machine and the account of the processing machine (local network account) are separated, as described in Japanese Laid-Open Patent Publication No. 11-31132, a third party would have access to the process performed by the local network as long as the third party uses the web server account.

Additionally, the external connection machine converts the external connection machine account to an account enabling access to resources of the local network and logs in to the local network using the converted account. Accordingly, a third party would have access to a process performed in the local network if the third party steals the local network account.

(2) Perform Exclusive Verification for External Connection

Verification is performed exclusively for the front end process to set an account for each user who logs in. The processes that may be performed in the front end process are restricted in accordance with the set account. In this manner, access is controlled in accordance with each account, or each user.

In this method, an external device does not have to acquire a local network account. However, since the verification result is valid only in the front end process (web server), all jobs performed remotely use the user account of the front end process. Accordingly, every processing result file has the same owner information. This results in problems related to the management of access rights. For example, presuming that a number of departments, which include department A, owning a file of client a, and department B, owning a file of client b, are connected to a local network, a job requested by client a and a job requested by client b would have the same user account. Thus, a person in department A would be able to access a file belonging to a client of department B and vice versa. This is a problem when managing access rights (accounts).

Further, a user who can perform the front end process with an external connection machine has the right to send a remote job request to other machines connected to the local network without any verification.

A user having account or system management authority (super user) is normally required to be verified in order to access other machines. However, if a third party steals a user account, which is verified in the front end process, the third party may be able to inflict a wide range of damage to the local network. Thus, there is a security problem with respect to an attack from outside of the local network.

(3) Prepare a Processing Exclusive Machine

Prepare one or more exclusive machines that receive requests for performing jobs from the external connection machine. The one or more exclusive machines unconditionally receive a request from the external connection machine. In this case, the external connection machine and the processing exclusive machine form a group, which is separated from the local network by a firewall.

In this method, since the range of remote job requests is limited, the system is protected from attacks from outside the local network. However, the exclusive machine is separated from the local network by a firewall. Thus, a terminal connected to the local network cannot access the exclusive machine. Thus two machines must be prepared, one for accessing the local network and one as the exclusive machine. Further, changes in the processing amount ratio of the local network and the external service cannot be adjusted with flexibility. Accordingly, resources of the entire local network cannot be used effectively. In other words, the system does not have sufficient flexibility.

SUMMARY OF THE INVENTION

The present invention provides an information processing system connected to an external user terminal by way of a wide area network. The system controls an access right of an external user who uses the external user terminal to input information and login. The system includes an external connection unit for executing a first program that receives a login request of the external user and for providing the external user with a predetermined service when the external user is verified through the login request. The first program has a process ID. An external verification unit includes an external user management file, in which external user verification information is registered beforehand. The external verification unit compares the input information of the login request with the external user verification information to verify the external user. The external verification unit further includes a process/user association file for storing verified external user verification information and the process ID of the first program in association with each other.

A further perspective of the present invention is an information processing system connected to an external user terminal by way of a wide area network. The system controls an access right of an external user who uses the external user terminal to input information and login. The system includes an external connection unit for executing a first program that receives a login request of the external user and for executing a second program that issues a job request corresponding to a service that is to be provided to the external user. A process ID is assigned to the first program. An external verification unit compares the input information of the login request with external user verification information, which is registered beforehand in the external verification unit, to verify the external user. The external verification unit stores the verified external user verification information and the process ID of the first program in association with each other. A job performing unit executes a third program that performs a job, which is requested in accordance with an account of a local network associated with an account of the external user, based on the content of the job request.

A further perspective of the present invention is an information processing system connected to an external user terminal by way of a wide area network. The system controls an access right of an external user who uses the external user terminal to input information and login. The system includes an external connection unit for executing a first program that receives a login request of the external user and a second program for issuing a job request corresponding to a service that is to be provided to the external user. A process ID is assigned to the first program. An external verification unit compares the input information of the login request with external user verification information, which is registered beforehand in the external verification unit, to verify the external user. The external verification unit includes a process/user corresponding file for storing the verified external user verification information and the process ID of the first program to have relation each other. A job performing unit includes a user definition file in which an account of an external user and an account of a local network are previously defined in association with each other. When the account of the local network associated with the account of the external user is defined in the user definition file, the job performing unit performs a requested job in accordance with the account of the local network in response to the job request.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

In the drawings, like numerals are used for like elements throughout.

Figure 1:
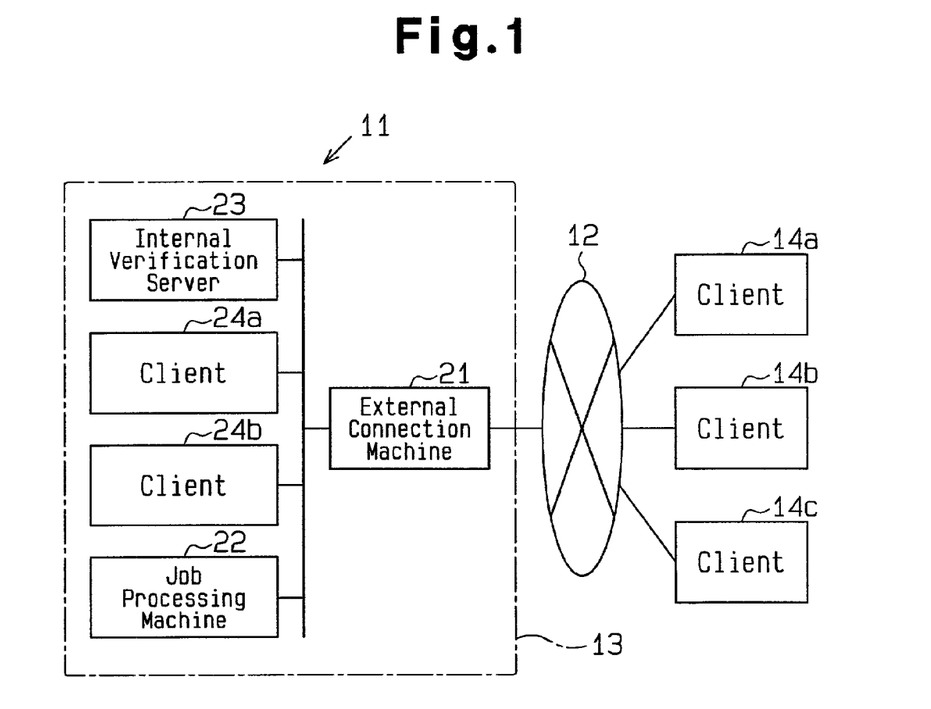
FIG. 1 is a schematic block diagram of a network including an information processing system according to a first embodiment of the present invention.

Referring to FIG. 1, an information processing system 11 according to a first embodiment of the present invention is connected to a plurality of (in the first embodiment, three) client computers (hereafter referred to as clients) 14a–14c via a wide area network 12, such as the Internet.

The information processing system 11 includes an external connection machine 21, a job performing machine 22, an internal verification server 23, and a plurality of (in the first embodiment, two) clients 24a, 24b, which serve as internal user terminals. The external connection machine 21, the job performing machine 22, the internal verification server 23, and the clients 24a, 24b are connected to one another by network cables and form a local network 13. The local network 13 includes one external connection machine 21, one internal verification server 23, and one or more job performing machines 22 (only one shown in FIG. 1).

The local network 13 may consist of a local area network (LAN) or a wide area network (WAN). Optionally, machines 21, 22 may be connected in a wireless manner.

The external connection machine 21 receives a login request from a user outside the local network 13 (hereafter referred to as external user) through one of the clients 14a, 14b, 14c. The external connection machine 21 includes an external verification server 41 (refer to FIG. 3). The external verification server 41 determines whether the external user who sent a login request is an authorized user and determines whether the external user has the right to access a service provided by the information processing system 11.

When receiving an instruction from an external user who is granted access, the external connection machine 21 requests the job performing machine 22 to perform a process (job) in order to provide service information to the external user. The external connection machine 21 receives the results of the job performed by the job performing machine 22 and provides (sends) the job results to the external user (requesting client 14a, 14b, or 14c).

The computers connected to the local network 13 (e.g., the clients 24a, 24b and the job performing machine 22) verify login requests generated by users in the local network 13 (hereafter referred to as internal users).

More specifically, the internal verification server 23 has a verification information database (not shown). The verification information database stores verification information (username and password) used to verify internal users. Each computer (e.g., the clients 24a, 24b and the job performing machine 22) uses the information provided from the internal verification server 23 to verify internal users.

The internal verification server 23 retrieves a password, which corresponds to a username input during a login, from the verification information database and sends the password to the computer (e.g., the clients 24a, 24b and the job performing machine 22) which in turn compares the received password with the password input to the login and verifies the user. When a user is granted access through the verification performed by the internal verification server 23, the internal user may use the resources in the local network 13.

Each computer in the local network may have a verification information database so that the computer performs verifications by itself. This would enable each computer to verify internal users.

Further, the internal verification server 23 may compare the username and password input from each computer during a login with verification information (usernames and passwords) that is registered beforehand.

The information processing system 11 is configured by computer programs executed by general-purpose computers, such as personal computers and work stations.

Figure 2:
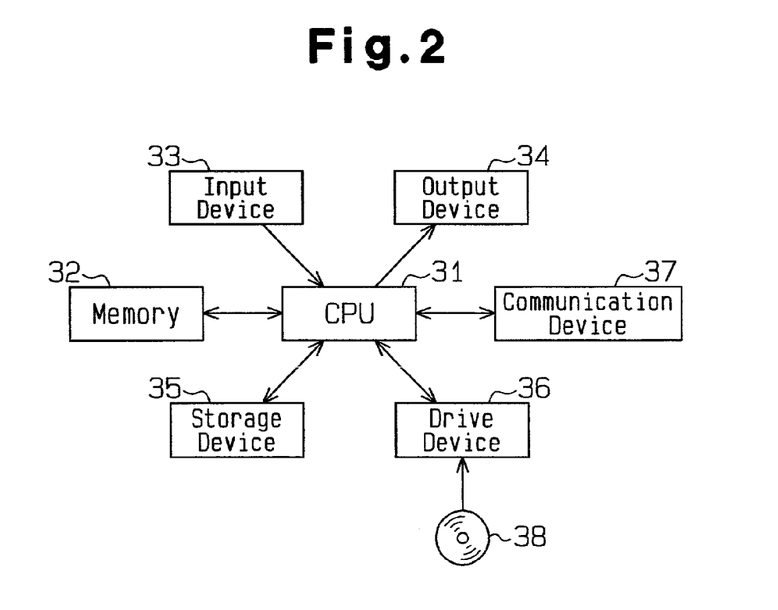
FIG. 2 is a schematic block diagram of a computer of the network of FIG. 1.

FIG. 2 is a schematic block diagram of each of the computers (clients 24a, 24b). Each computer includes a central processing unit (CPU) 31, a memory 32, an input device 33, an output device 34, a storage device 35, a drive device 36, and a communication device 37. The memory 32, the input device 33, the output device 34, the storage device 35, the drive device 36, and the communication device 37 are each connected to the CPU 31.

The CPU 31 executes the programs stored in the memory 32 to perform the process that is required to provide service information. The memory 32 stores programs and data that are required to provide service information. The memory 32 may include one or more of a cache memory, a system memory, or a display memory.

The input device 33 includes a keyboard and a mouse device (not shown), which are used by a user to input requests and instructions. The output device 34 may be a display (VDT) or monitor, which is used to generate a service screen, or a printing device, such as a printer, which performs printing.

The storage device 35 may be a magnetic disc device, an optical device, or a magneto-optical device. The storage device 35 stores programs and data. In response to instructions from the input device 33, the CPU 31 sends the programs and data to the memory 32 to execute the programs. The storage device 35 also functions as a database.

The drive device 36 drives a recording medium 38 and accesses the data recorded on the recording medium 38. The recording medium 38 may be a memory card, a floppy disk, an optical disc (e.g., CD-ROM or DVD ROM), a magneto-optic disc (e.g., MO or MD), or a portable computer-readable recording medium. Programs and data may be stored in the recording medium 38 so that the programs and data are loaded to the memory 32 when necessary.

The communication device 37 performs data conversion that is required for communication to transfer programs and data between other computers. The computer may receive programs and data from a main recording device and an auxiliary recording device of another network-connected computer (external information provider) via the communication device 37 and load the programs and data to the memory 32.

Figure 3:
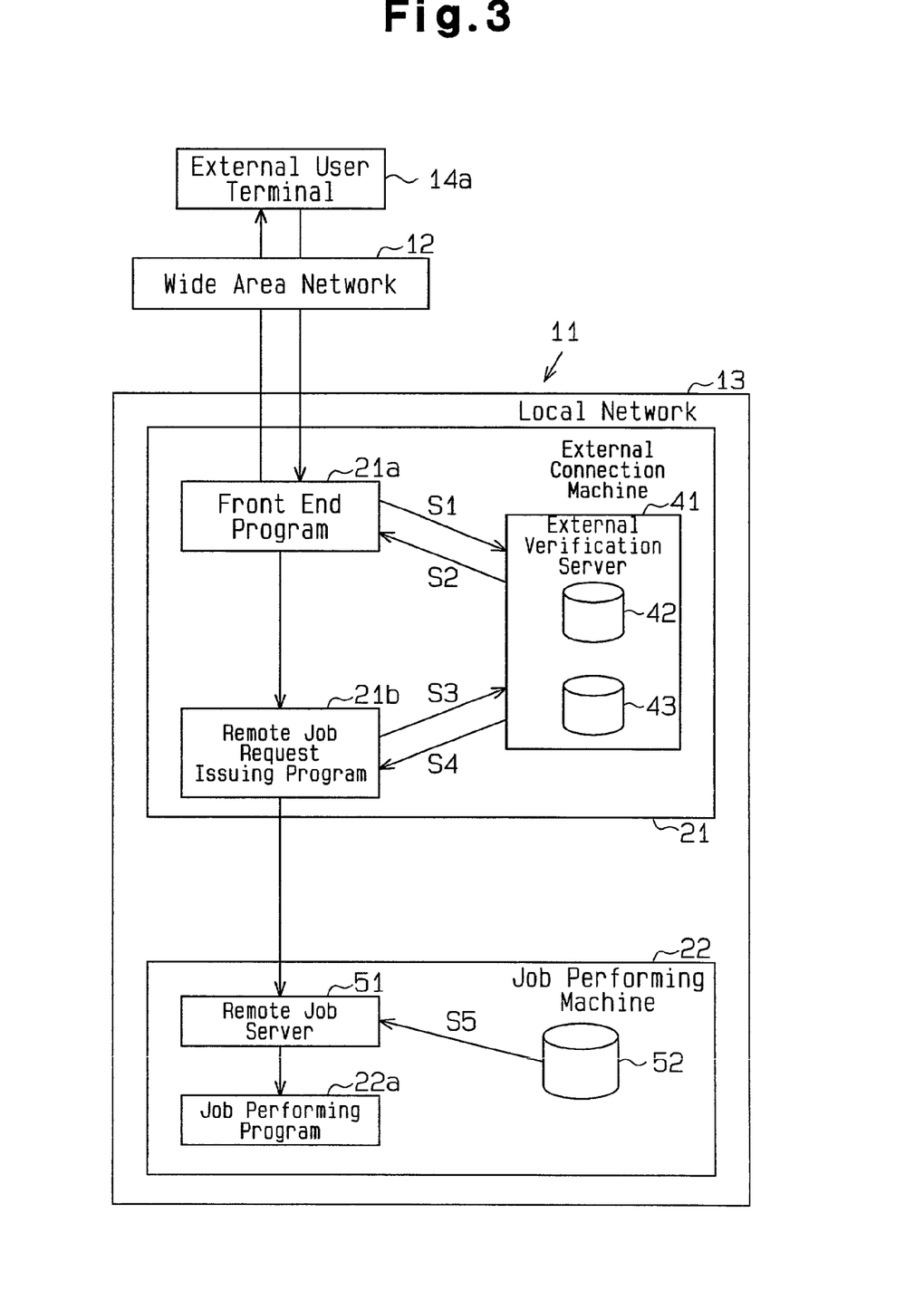
FIG. 3 is a schematic block diagram of an information processing system according to the first embodiment of the present invention.

FIG. 3 is a schematic block diagram of the information processing system.

FIG. 3 illustrates the configuration that is required to verify an external user (external user terminal). The verification of a login request from the client 14a (external user terminal) will now be discussed. The internal verification server 23 and the clients 24a, 24b are not shown in FIG. 3.

The external connection machine 21 is connected to the external user terminal 14a and initiates a front end program 21a in response to a login request from the external user terminal 14a. The front end program 21a is a program for providing an external user (external user terminal) with a predetermined service (function).

In response to an instruction from the external user terminal 14a, the external connection machine 21 initiates a remote job request issuing program (hereafter, referred to a job issuing program) 21b in accordance with the front end program 21a. The job issuing program 21b is a program for designating one or more of the job performing machines 22 (only one shown in FIG. 3) and requesting the designated job performing machine 22 to perform the process (job) corresponding to the service information that is provided to the external user (external user terminal).

The external connection machine 21 includes the external verification server 41, which verifies the external user through the login request from the external user terminal 14a. The external verification server 41 includes an external user management file 42 and a process/user association file 43.

The external user management file 42 stores external user information, which serves as verification information that is required when the external user generates a login request. The external user information (verification information) includes the username and password of the external user. The external verification server 41 verifies the external user by comparing login information (username and password) received from the external user terminal 14a with the external user information (verification information) stored in the external user management file 42.

Verification information of a verified external user and a process ID of the front end program 21a are stored in the process/user association file 43 in association with each other. More specifically, the username of a verified external user and a process ID are stored in the process/user association file 43 in association with each other.

When the external connection machine 21 is logged in, the external verification server 41 identifies the process of a browser program (browser process) executed by the external user terminal 14a. The external verification server 41 stores a verified external username and browser process identification information, such as a cookie generated when a user first logs in the process/user association file 43 in association with each other. The association of the verified external username and the browser process identification information is maintained until the user gives an instruction to log out of the browser program (i.e., the front end program 21a being performed in correspondence with the log out) or until a predetermined time, which is set for security reasons, elapses.

When the external user terminal 14a is used to login (first access), the process/user association file 43 stores the verified external username and the process ID of the front end program 21a in association with each other and stores the verified external username and the browser process identification information in association with each other.

Accordingly, when the browser process identification information is held in the process/user association file 43, the front end program 21a checks the external verification username based on the browser process identification information from the second (and subsequent) access by the same external user terminal 14a (browser program). If the external verification username associated with the browser process identification information is registered, the front end program 21a stores the verified external username and the process ID of the front end program 21a in the process/user association file 43 in association with each other.

In this manner, the same external user terminal 14a may continue to initiate multiple processes of the front end program 21a based on the associated information of the first login (username and password).

The job performing machine 22, which receives a job request issued by the job issuing program 21b, includes a remote job server 51 for executing a job performing program 22a. The remote job server 51 executes the job performing program 22a in accordance with an account set in the local network 13 (i.e., local user account).

More specifically, the job performing machine 22 has a user definition file 52 in which external user accounts (valid accounts of the external connection machine 21) and local user accounts (valid accounts of the job performing machine 22) are previously defined in association with each other. That is, the usernames of the external users registered in the external user management file and usernames of local user are previously defined in the user definition file 52 in association with each other.

The remote job server 51 receives a job request and an external username from the job issuing program 21b and refers to the user definition file 52 to find a local username associated with the external username. In other words, the remote job server 51 determines whether or not the external user accessing the external connection machine 21 has a local user account, which is valid in the job performing machine 22. When a local username associated with the external user is found, the remote job server 51 executes the job performing program 22a, which is based on a job request, in accordance with the account (local username).

The operation of the information processing system 11 will now be discussed.

First, when the external connection machine 21 receives an external user's login request from the external user terminal 14a, the external connection machine 21 executes the front end program 21a. In accordance with the front end program 21a, the external connection machine 21 asks the external user to input login information (username and password) so that the external user can be verified. When the external connection machine 21 receives the login information from the external user terminal 14a, the login information is sent to the external verification server 41 in the external connection machine 21. In other words, the front end program 21a requests the external verification server 41 to verify the external user (step S1 in FIG. 3).

The external verification server 41 receives the login information from the front end program 21a and compares the login information with the external user information (verification information, such as the username and password), which is registered in the external user management file 42. In other words, the external verification server 41 determines whether the external user requesting to login, is an authorized user.

When the external verification server 41 verifies that the external user is an authorized user, the external verification server 41 stores the verified external username and the verified (i.e., the verification requesting) process ID of the front end program 21a in the process/user association file 43 in association with each other. If the external user is not an authorized user, the external verification server 41 does not register the external user in the process/user association file 43.

In this manner, the external verification server 41 verifies the external user as instructed by the front end program 21a and sends information indicating whether the external user is registered in the process/user association file 41 to the front end program 21a (step S2). The external connection machine 21 grants access to the external user when the information received from the external verification server 41 indicates that registration of the external user is permitted. The external connection machine 21 denies access to the external user when the information received from the external verification server 41 indicates that registration of the external user is not permitted.

When the external user is granted access and the external user (external user terminal) instructs for a process (job) corresponding to service information to be performed, the front end program 21a designates the job performing machine 22 and the job contents and initiates the job issuing program 21b.

The job issuing program 21b informs the external verification server 41 of the process ID of the front end program 21a, which is requesting verification to the external verification server 41, and inquires whether the external verification username is associated with the process ID (step S3).

The external verification server 41 uses the process ID received from the job issuing program 21b as a key to check the process/user association file 43 (step S3). If a verified external username associated with the process ID is registered in the file 43, the external verification server 41 informs the job issuing program 21b of the verified external username (step S4). In the job issuing program 21b, the external connection machine 21 provides the remote job server 51 of the designated job performing machine 22 with a job request, which includes the verified external username retrieved from the external verification server 41.

The remote job server 51 refers to the user definition file 52 to find the local username associated with the verified external username (step S5). When an associated local username is found in the file 52, the remote job server 51 executes the job performing program 22a associated with the requested job content with the local username. If an associated local username is not found in the file 52, the remote job server 51 does not have the right to perform the content of the requested job.

In this manner, the job performing machine 22 performs the requested job only when a local username associated with the verified external username is found and sends the results to the front end program 21*a*. In the front end program 21*a*, the external connection machine 21 provides (sends) the service information to the external user (external user terminal 14*a*), which is the requester.

The information processing system 11 of the first embodiment has the advantages described below.

(1) The front end program 21*a* of the external connection machine 21 sends the login information of the external user (external username and password) to the external verification server 41 and requests the external verification server 41 to verify the external user. After the external verification server 41 verifies the external user, the front end program 21*a* initiates the job issuing program 21*b* as instructed by the external user. The job issuing program 21*b* retrieves the verified external username associated with the process ID from the external verification server 41 and requests the remote job server 51 to perform a job. Accordingly, as long as the external user does not pass the verification using the front end program 21*a*, the external user cannot access the resources of the local network 13. Further, information enabling direct login to the local network (i.e., local user name or local user account) does not flow through the wide area network 12. This maintains the local network in a secure state.

(2) Even if a third party steals the external user verification information (username, password), the third party can only obtain the services provided by the front end program. In other words, the third party cannot directly access any resource of the local network 13. This decreases the damages inflicted to the local network.

(3) The external verification server 41 verifies the external user by itself and associates the verified external username with a user account (local username). The association enables the job performing machine 22 of the local network 13 to be used while completely separating the verification system from the wide area network 12. Accordingly, the resources of the job performing machine 22 and the like are effectively used. This saves costs of the information processing system 11.

(4) The job performing machine 22 includes the user definition file 52. Thus, the job performing machine 22 sets the rights to access the local network 13 for any verified external user. Accordingly, accounts are flexibly set in accordance with the type of service (i.e., the performed jobs) or required service. This prevents the files of users from being accessed by other external users.

Figure 4:
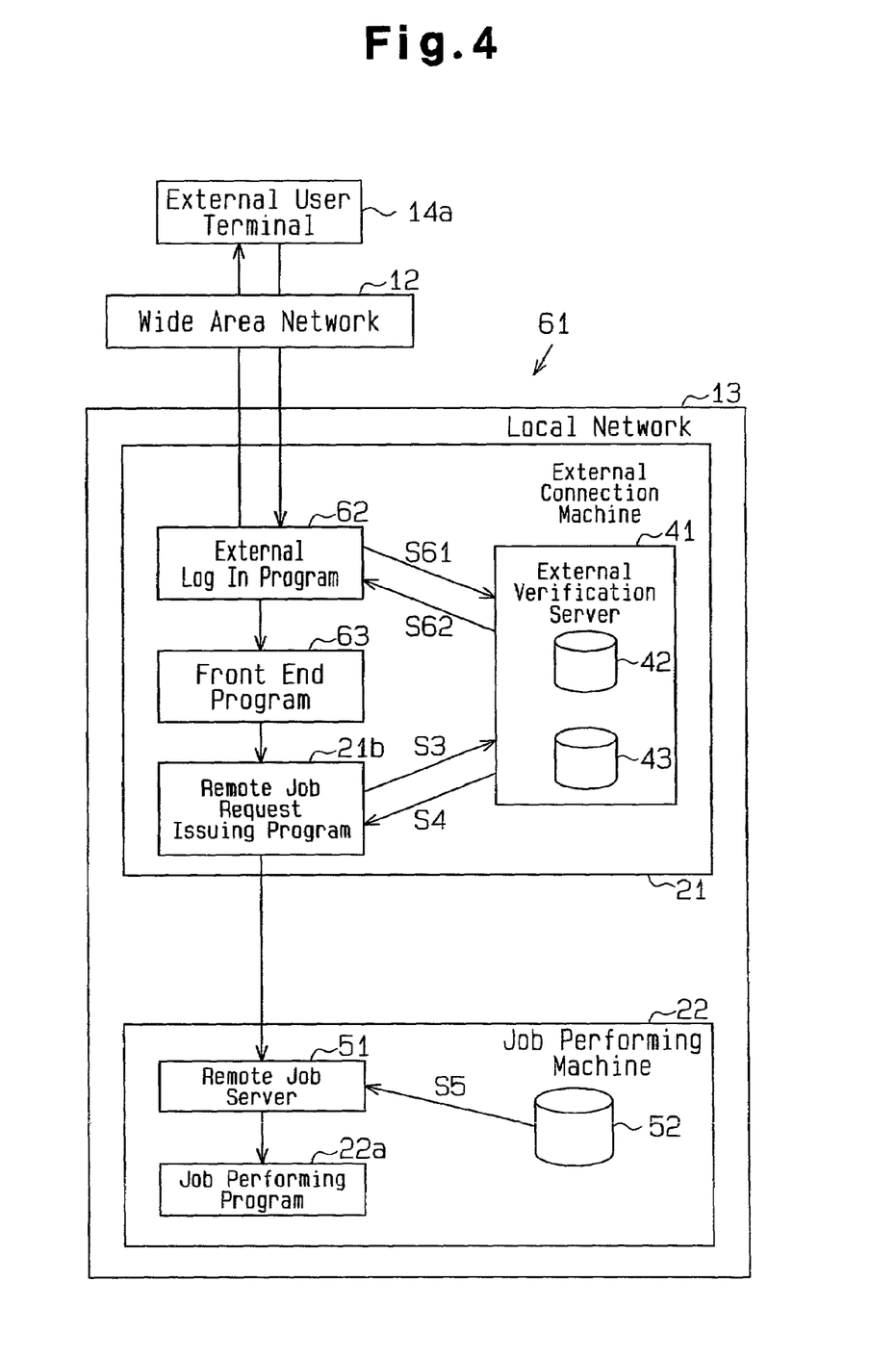
FIG. 4 is a schematic block diagram of an information processing system according to a second embodiment of the present invention.

Referring to FIG. 4, an external connection machine 21 of an information processing system 61 according to a second embodiment of the present invention includes an external login program 62 and a front end program 63. The external login program 62 receives login information (input username and password) and requests the external verification server 41 to perform verification. The front end program 63 functions as a window through which services are provided to an external user. The two programs 62, 63 are executed in processes that are independent from one another.

In response to a login request from an external user, the external login program 62 requests the external verification server 41 to perform verification (step S61). The external verification server 41 stores a process ID of the external login program 62 and the verified external username in the process/user association file 43 in association with each other.

The external login program 62 initiates the front end program 63 only when the external verification server 41 receives information that the external verification server 41 registered the process ID and the verified external username (step S62).

The front end program 63 designates the process ID of the external login program 62, the job performing machine 22 subject to the job request, and the content of the job that is to be performed. Then, the front end program 63 initiates the job issuing program 21*b*.

The job issuing program 21*b* informs the external verification server 41 of the process ID of the external login program 62, which requests the external verification server 41 to perform verification, to inquire the verified external username corresponding to the process ID (step S3). Subsequently, the same processing as in the first embodiment is performed to provide the external user with service information.

The information processing system 61 of the second embodiment has the advantages described below.

The external login program 62, which is independent from the front end program 63, requests the external verification server 41 to perform verification. By separating the program that rewrites the management file 42 from the program that rewrites the association file 43, it becomes difficult for one to counterfeit a job request using a malicious program when directly infiltrating the external connection machine 21 or when using another machine as the external connection machine 21 in a fraudulent manner. To counterfeit a job request, the process ID must be counterfeited. In such case, the contents of each of the files 42, 43 must be rewritten. This prevents the issuance of a job request by a third party having a malicious intent.

In step S61, the external login program 62 may use the process ID of the front end program 63 to request the external verification server 41 to verify the external user. In this case, the external login program 62 initiates the front end program 63 and requests the external verification server 41 to perform external user verification after acquiring the process ID of the front end program 63.

In response to a request from the external user (external user terminal), the front end program 63 initiates the job issuing program 21*b* and provides the process ID of the front end program 63 to the job issuing program 21*b*. Accordingly, the job issuing program 21*b* may acquire the verified external username with its process ID.

Figure 5:
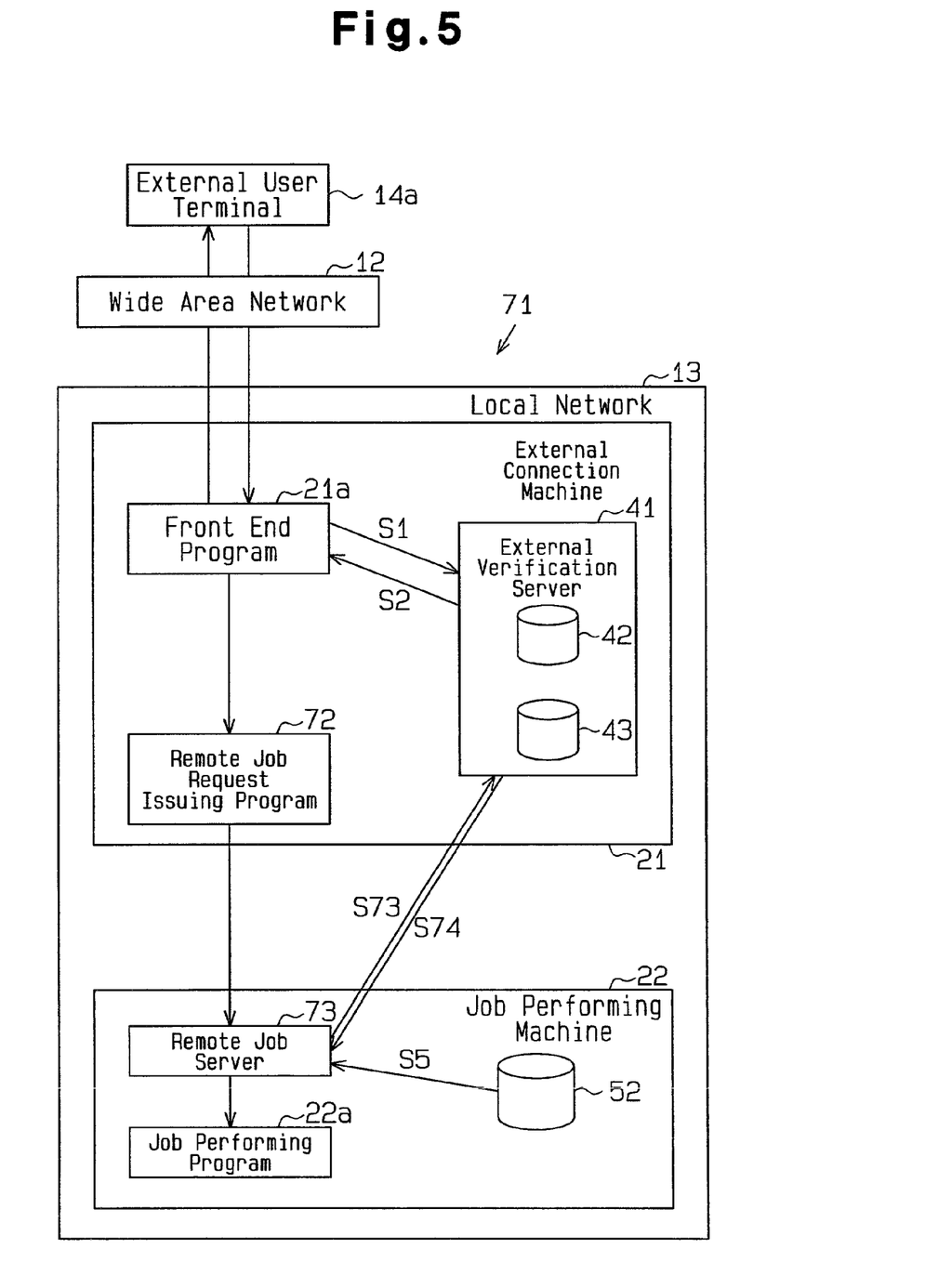
FIG. 5 is a schematic block diagram of an information processing system according to a third embodiment of the present invention.

Referring to FIG. 5, the external connection machine 21 of an information processing system 71 according to a third embodiment of the present invention includes the front end program 21*a* and a job issuing program 72. The job issuing program 72, which is initiated by the front end program 21*a*, provides a process ID of the front end program 21*a* to the job performing machine 22 without making any inquiries to the external verification server 41, and requests a job to be performed.

The job performing machine 22 includes a remote job server 73 and the job performing program 22*a*. The remote job server 73 checks the process ID, which is received from the job issuing program 72, with the external verification server 41 of the external connection machine (step S73). The remote job server 73 obtains the corresponding verified external username from the process/user association file 43 of the external verification server 41 (step S74). Subsequently, in the same manner as in the first embodiment, the remote job server 73 checks the user definition file 52 to find a local username corresponding to the acquired verified external username and determines whether the verified external user has the right to perform a remote job.

The information processing system 71 of the third embodiment has the advantages described below.

The remote job server 73 directly checks the external verification server 41. Accordingly, it is difficult for an infiltrator to counterfeit a job request with a malicious program and pass the check of the external verification server 41. This prevents an infiltrator from having a job performed.

Figure 6:
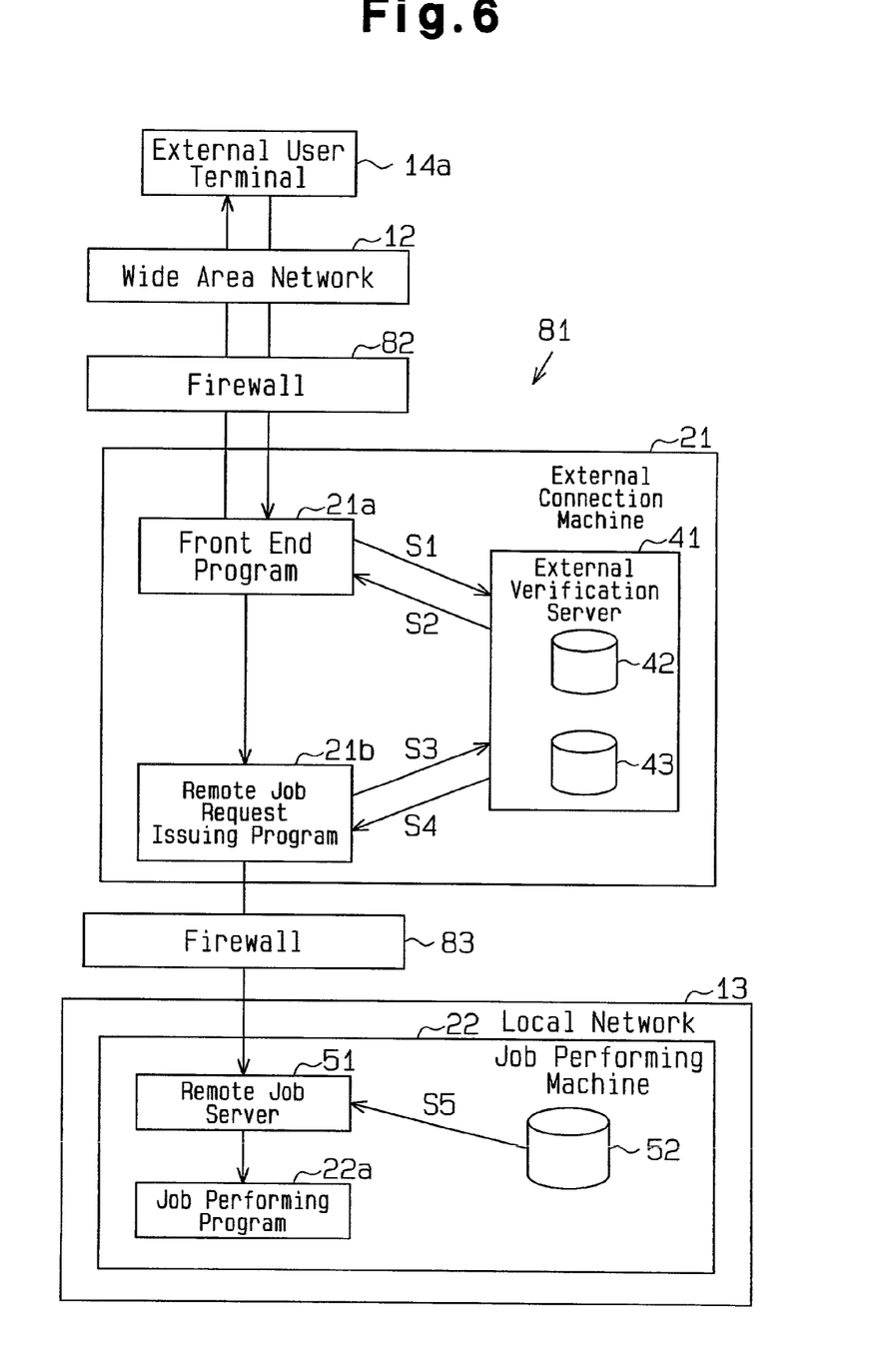
FIG. 6 is a schematic block diagram of an information processing system according to a fourth embodiment of the present invention.

Referring to FIG. 6, in an information processing system 81 according to a fourth embodiment of the present invention, the external connection machine 21 is separated from the local network 13 by providing a firewall 82 between the external connection machine 21 and the local network 13. The firewall 82 partially or completely shuts out communication that is not related with services provided by the external connection machine 21, communication that is not transmitted from certain external user terminals, and communication that is not transmitted to the external connection machine 21.

A further firewall 83 is arranged between the external connection machine 21 and the local network 13. The firewall 83 shuts out communication that is not related with a remote job request before the communication reaches the local network 13.

The information processing system 81 of the fourth embodiment has the advantages discussed below.

The external connection machine 21 is separated from the local network 13. Thus, even if a third party infiltrates the external connection machine 21, the third party cannot access the resources of the local network 13. The firewall 82 is provided between the external connection machine 21 and the wide area network 12, and the firewall 83 is arranged between the external connection machine 21 and the local network 13. The firewalls 82, 83 restrict communication with external devices. This effectively prevents the local network 13 from being attacked and guarantees higher security.

Figure 7:
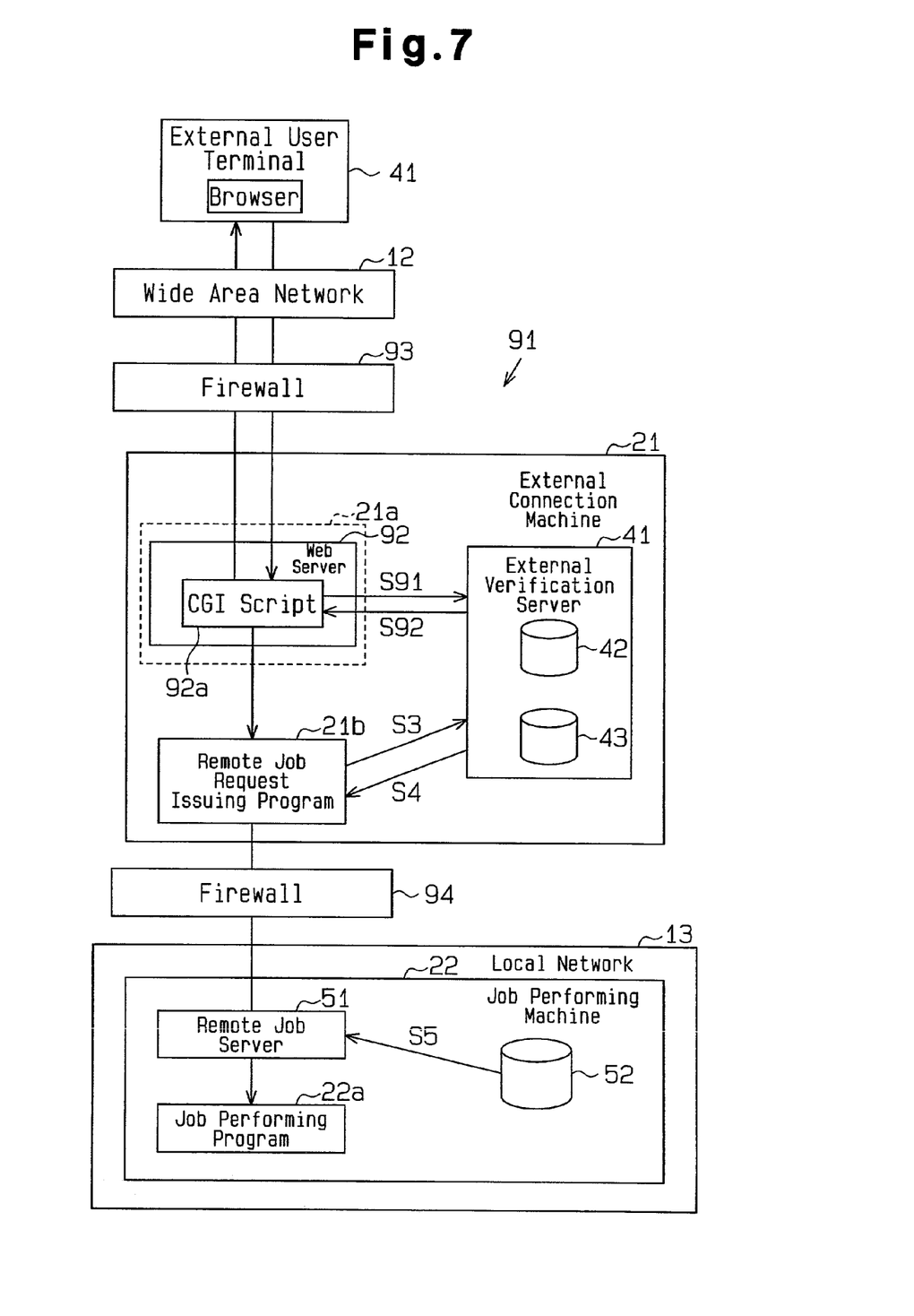
FIG. 7 is a schematic block diagram of an information processing system according to a fifth embodiment of the present invention.

Referring to FIG. 7, in an information processing system 91 according to a seventh embodiment of the present invention, the external connection machine 21 includes a web server 92. The service (function) provided by the front end program 21a is generated by a common gateway interface (CGI) script (program) 92a of a web server 92.

An external user accesses the web server 92 using a browser program (browser) of the external user terminal 14a. In response to the access, the web server 92 provides web page browsing service. More specifically, the web server 92 receives an instruction from the external user terminal 14a to refer to a certain web page, initiates the CGI script 92a corresponding to the web page in accordance with the instruction, and changes the display contents or response content.

A firewall 93 is arranged between the wide area network 12 and the external connection machine 21. The firewall 93 shuts out packets that are not HTTP protocol packets used for communication between the web server 92 and the external user terminal 14a (browser). A firewall 94 is provided between the local network 13 and the external connection machine 21 to shut out packets that are not used to request jobs.

When initiating a service, the CGI script 92a provides input login information (username, password) to the external verification server 41 and requests for verification (step S91). The CGI script 92a initiates the job issuing program 21b only when the external verification server 41 registers the external user and a process ID in the process/user association file 43 in association with each other (step S92).

Subsequently, the same processing as the first embodiment is performed to provide the external user with service information.

It should be apparent to those skilled in the art that the present invention may be embodied in many other specific forms without departing from the spirit or scope of the invention. Particularly, it should be understood that the present invention may be embodied in the following forms.

Figure 8:
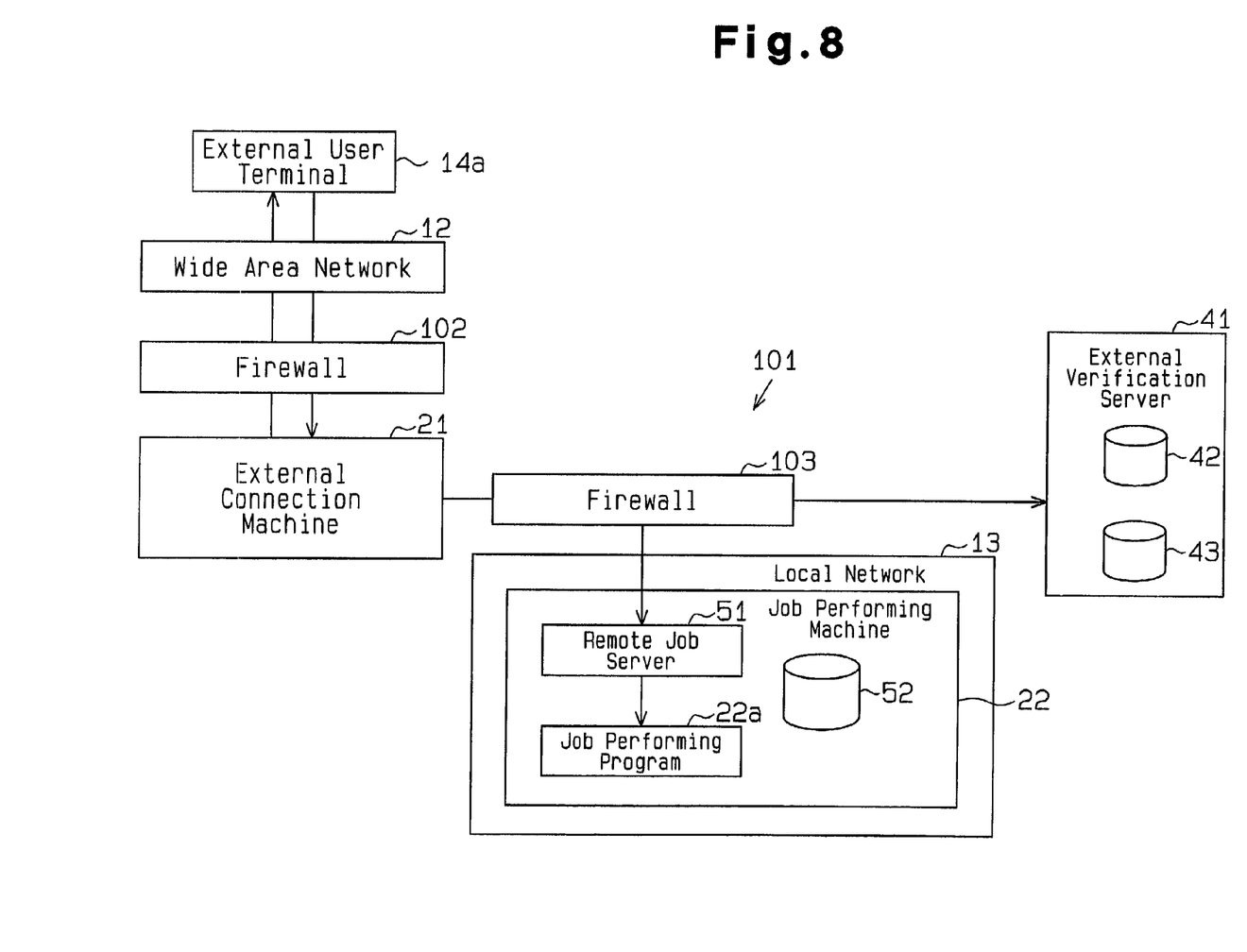
FIG. 8 is a schematic block diagram showing a modification of the information processing system of FIG. 3.

A network may be configured by an information processing system 101, such as that shown in FIG. 8. In the information processing system 101, a firewall 102 is provided between the wide area network 12 and the external connection machine 21. The external verification server 41 is arranged independently from the external connection machine 21. A firewall 103 is provided between the external connection machine 21, the external verification server 41, and the local network 13. The firewall 103 does not allow for communication other than a verification request to the external verification server 41. The firewalls 102, 103 further increase security.

The network configuration (e.g., firewall location) may be varied in accordance with how the system is used.

More than one external connection machine 21 may be employed. However, for security reasons, it is preferred that the number of the external connection machines 21 be as small as possible. Further, the numbers of the external user terminal 14a (14b, 14c) and the job performing machine 22 is restricted only by the capability of the system and the network.

The present examples and embodiments are to be considered as illustrative and not restrictive, and the invention is not to be limited to the details given herein, but may be modified within the scope and equivalence of the appended claims.

What is claimed is:

1. An information processing system connected to an external user terminal by way of a wide area network, wherein the system controls an access right of an external user who uses the external user terminal to input information and login, the system comprising:

an external connection unit executing a first program that receives a login request of the external user and for providing the external user with a predetermined service when the external user is verified through the login request, wherein a process ID is assigned to the first program, wherein the external connection unit issues a job request, which corresponds to the service that is to be provided to the external user in response to an instruction from the external user terminal;

an external verification unit including an external user management file, in which external user verification information is registered beforehand, wherein the external verification unit compares the input information of the login request with the external user verification information to verify the external user, the external verification unit further including a process/user association file for storing verified external user verification information and the process ID of the first program in association with each other; and a job performing unit performing a job corresponding to the job request of the external connection unit, wherein the job performing unit includes a user definition file in which the external user verification information and an account of a local network are previously defined in association with each other, and wherein the job performing unit receives the job request and the external user verification information, determines whether the account of the local network in association with the received external user verification information is defined in the user definition file, and performs the job corresponding to the job request in accordance with the account of the local network that is associated with the received external user verification information.

2. The system according to claim 1, wherein the external connection unit executes a second program for issuing a job request corresponding to the service that is to be provided to the external user in response to an instruction from the external user terminal.

3. The system according to claim 2, wherein the external connection unit proceeds from the first program to the second program when the external verification unit verifies the external user.

4. The system according to claim 1, wherein the first program includes an external login program for receiving the login request of the external user and a service providing program for providing the external user with the predetermined service; and
wherein the external connection unit initiates the service providing program when the external verification unit verifies the external user.

5. The system according to claim 1, wherein the external connection unit requests the external verification unit to check the process ID of the first program, and the external verification unit provides the external connection unit with the external user verification information if the external user is successfully verified.

6. The system according to claim 1, wherein the job request includes the process ID of the first program, and wherein the job performing unit requests the external verification unit to check the process ID of the first program and in response to the request, when the external user verification information associated with the process ID of the first program is stored in the process/user association file, the external verification unit reads the external user verification information from the process/user association file and provides the external user verification information to the job performing unit.

7. The system according to claim 1, wherein the external connection unit includes a web server executing a common gateway interface (CGI) script, which serves as the first program.

8. The system according to claim 1, further comprising a firewall provided between the external connection unit and the external verification unit.

9. An information processing system connected to an external user terminal by way of a wide area network, wherein the system controls an access right of an external user who uses the external user terminal to input information and login, the system comprising:
an external connection unit executing a first program that receives a login request of the external user and for executing a second program that issues a job request corresponding to a service that is to be provided to the external user, wherein a process ID is assigned to the first program;
an external verification unit comparing the input information of the login request with external user verification information, which is registered beforehand in the external verification unit, to verify the external user, wherein the external verification unit stores the verified external user verification information and the process ID of the first program in association with each other; and
a job performing unit receiving the job request and the external user verification information, determining whether an account of a local network that is associated with the received external user verification information is found, and executing a third program that performs a job, which is requested in accordance with the account of the local network associated with the received external user verification information.

10. The system according to claim 9, wherein the external connection unit checks the external user verification information, which is associated with the process ID of the first program, through the external verification unit in accordance with the second program and, when the external user verification information is found, issues the job request; and
wherein the job processing unit acquires the account of the local network, which is associated with the received external user verification information.

11. The system according to claim 9, wherein the external connection unit issues the job request, which includes the process ID of the first program, in accordance with the second program; and
wherein the job processing unit checks the external user verification information, which is associated with the process ID of the first program, through the external verification unit and acquires the account of the local network, which is associated with the external user verification information.

12. The system according to claim 9, wherein the job performing unit includes a user definition file in which the account of the external user and the account of the local network are previously defined in association with each other.

13. The system according to claim 9, further comprising a firewall provided between the external connection unit and the job performing unit.

14. An information processing system connected to an external user terminal by way of a wide area network, wherein the system controls an access right of an external user who uses the external user terminal to input information and login, the system comprising:
an external connection unit executing a first program that receives a login request of the external user and a second program for issuing a job request corresponding to a service that is to be provided to the external user, wherein a process ID is assigned to the first program;
an external verification unit comparing the input information of the login request with external user verification information, which is registered beforehand in the external verification unit, to verify the external user, wherein the external verification unit includes a process/user corresponding file for storing the verified external user verification information and the process ID of the first program in association with each other; and
a job performing unit including a user definition file in which the external user verification information and an account of a local network are previously defined in association with each other, wherein the job performing unit receives the job request and the external user verification information, determines whether the account of the local network associated with the received external user verification information is defined in the user definition file, and performs a requested job in accordance with the account of the local network associated with the received external user verification information in response to the job request.

15. The system according to claim 14, wherein when the external user is verified through the login request, the external connection unit inquires the external verification unit whether the process/association file stores the external user verification information associated with the process ID of the first program in accordance with the second program and issues the job request when confirming that the external verification unit stores the associated external user verification information.

16. The system according to claim 14, wherein the external connection unit provides the job performing unit with the job request that includes the process ID of the first program, and wherein the job performing unit inquires the external verification unit whether the external user verification information associated with the process ID of the first program included in the job request is stored in the process/user association file, and when the associated external user verification is stored in the process/association file, the external verification unit provides the job performing unit with the external user verification information.

* * * * *